United States Patent
Ryu et al.

(10) Patent No.: US 10,595,288 B2
(45) Date of Patent: Mar. 17, 2020

(54) METHOD FOR TRANSMITTING FRAME IN WIRELESS LAN SYSTEM AND WIRELESS TERMINAL USING SAME

(71) Applicant: LG ELECTRONICS INC., Seoul (KR)

(72) Inventors: Kiseon Ryu, Seoul (KR); Jeongki Kim, Seoul (KR); Hyunhee Park, Seoul (KR); Suhwook Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/321,820

(22) PCT Filed: May 17, 2017

(86) PCT No.: PCT/KR2017/005104
§ 371 (c)(1),
(2) Date: Jan. 29, 2019

(87) PCT Pub. No.: WO2018/038354
PCT Pub. Date: Mar. 1, 2018

(65) Prior Publication Data
US 2019/0174442 A1    Jun. 6, 2019

Related U.S. Application Data

(60) Provisional application No. 62/377,663, filed on Aug. 21, 2016.

(51) Int. Cl.
*H04W 74/08* (2009.01)
*H04W 74/00* (2009.01)
(Continued)

(52) U.S. Cl.
CPC ..... *H04W 56/0005* (2013.01); *H04L 27/2666* (2013.01); *H04W 28/26* (2013.01);
(Continued)

(58) Field of Classification Search
None
See application file for complete search history.

(56) References Cited

U.S. PATENT DOCUMENTS

| 7,123,627 B2* | 10/2006 | Kowalski | H04L 12/2838 370/468 |
| 2005/0136833 A1* | 6/2005 | Emeott | H04W 52/0225 455/11.1 |

(Continued)

FOREIGN PATENT DOCUMENTS

| KR | 20160090360 A * | 7/2016 | ........ H04W 72/1289 |
| KR | 1020160090360 | 7/2016 | |

OTHER PUBLICATIONS

IEEE Computer Society, "IEEE P802.11-REVmc/D8.0, Draft Standard for Information technology—Telecommunication and information exchange between systems Local and metropolitan area networks—Specific requirements; Part 11," LAN/MAN Standards Committee, Aug. 2016, 4 pages.

(Continued)

*Primary Examiner* — Ajit Patel
(74) *Attorney, Agent, or Firm* — Lee, Hong, Degerman, Kang & Waimey PC

(57) ABSTRACT

A method for transmitting a frame in a wireless LAN system according to the present embodiment comprises: a step of determining whether to transmit a first frame to an AP through an EDCA by comparing a time parameter indicating the time used for transmission of a wireless terminal with a predetermined allowable time; a step of summing up, to the time parameter, a first required time for transmission of the first frame; a step of receiving, from the AP, a trigger frame
(Continued)

for multi-user uplink transmission; and a step of performing data processing for a second frame transmitted in response to the trigger frame, wherein a second required time for transmission of the second frame is not summed up to the time parameter.

10 Claims, 17 Drawing Sheets

(51) Int. Cl.
    *H04W 56/00*     (2009.01)
    *H04W 84/12*     (2009.01)
    *H04L 27/26*     (2006.01)
    *H04W 28/26*     (2009.01)
    *H04W 72/04*     (2009.01)

(52) U.S. Cl.
    CPC ....... *H04W 72/0446* (2013.01); *H04W 74/00* (2013.01); *H04W 74/08* (2013.01); *H04W 74/085* (2013.01); *H04W 84/12* (2013.01)

(56) References Cited

U.S. PATENT DOCUMENTS

| | | | | |
|---|---|---|---|---|
| 2005/0138451 A1* | 6/2005 | Simpson | ........... | H04W 52/0225 713/320 |
| 2006/0045051 A1* | 3/2006 | Floros | ................ | H04W 74/02 370/332 |
| 2006/0215686 A1* | 9/2006 | Takeuchi | ............ | H04W 28/18 370/445 |
| 2008/0101320 A1* | 5/2008 | Krahn | ................ | H04W 74/04 370/342 |
| 2009/0168717 A1* | 7/2009 | Ali | ........................ | H04W 28/16 370/329 |
| 2011/0051647 A1* | 3/2011 | Sampath | ............... | H04L 1/0003 370/312 |
| 2011/0141968 A1* | 6/2011 | Trainin | ................... | H04L 1/007 370/328 |
| 2014/0301383 A1* | 10/2014 | Sohn | ..................... | H04B 7/0452 370/338 |
| 2017/0318501 A1* | 11/2017 | Vikberg | ............... | H04W 72/085 |
| 2018/0199375 A1* | 7/2018 | Nezou | ................. | H04W 74/006 |

OTHER PUBLICATIONS

PCT International Application No. PCT/KR2017/005104, International Search Report dated Aug. 18, 2017, 6 pages.

Ahn, J, et al., "Multi-User EDCA", doc.: IEEE 802.11-16/0673r1, May 2016, 17 pages.

IEEE Computer Society, "IEEE P802.11ax/D1.1 Draft Standard for Information technology—Telecommunications and information exchange between systems Local and metropolitan area networks—Specific requirements; Part 11," LAN/MAN Standards Committee, Aug. 2016, 4 pages.

IEEE Computer Society, "IEEE P802.11ax/D1.1 Draft Standard for Information technology—Telecommunications and information exchange between systems Local and metropolitan area networks—Specific requirements; Part 11; Amendment 6," LAN/MAN Standards Committee, Feb. 2017, 465 pages.

* cited by examiner

FIG. 1
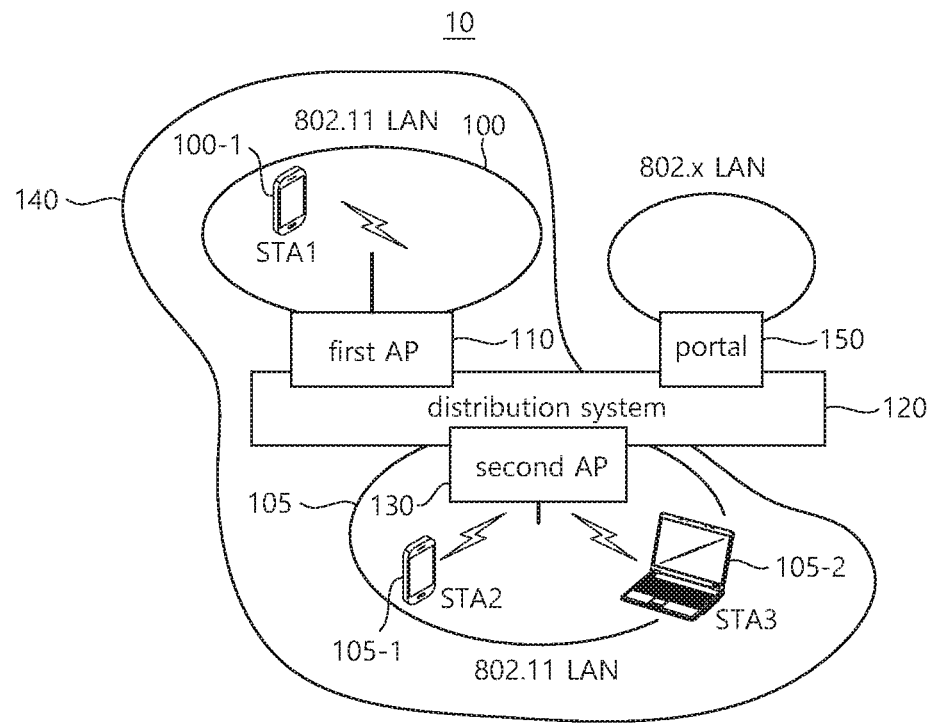
(A)
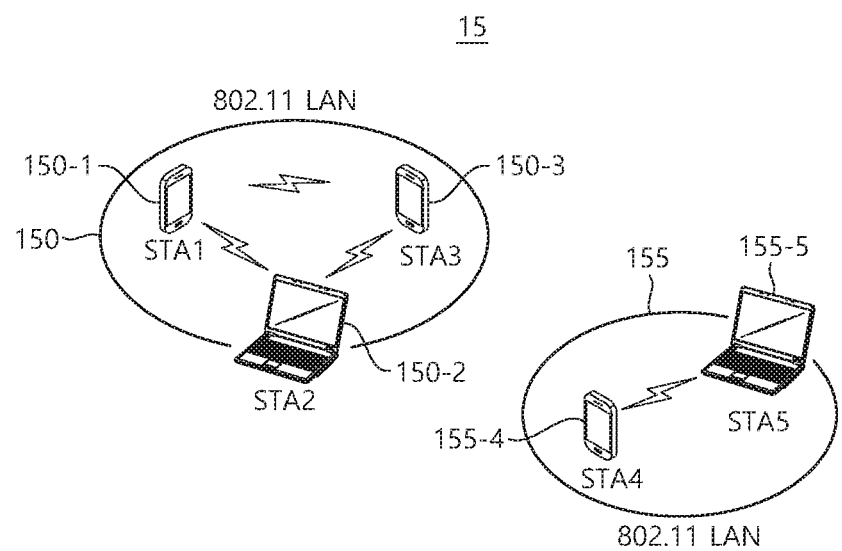
(B)

METHOD FOR TRANSMITTING FRAME IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2017/005104, filed on May 17, 2017, which claims the benefit of U.S. Provisional Application No. 62/377,663, filed on Aug. 21, 2016, the contents of which are all hereby incorporated by reference herein in their entirety.

TECHNICAL FIELD

The present invention relates to wireless communication and, most particularly, to a method for transmitting a frame in a wireless LAN system and a wireless device using the same.

BACKGROUND

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in the existing WLAN.

Specifically, scenarios for a wireless office, a smart home, a stadium, a hotspot, and the like receive attention in the next-generation WLAN. Discussions are ongoing on improvement in the performance of a WLAN system in the dense environment including a large number of APs and STAs based on relevant scenarios.

SUMMARY OF THE INVENTION

An object of this specification is to provide a method for transmitting a frame in a wireless LAN system and a wireless device using the same.

This specification relates to a method for transmitting a frame in a wireless LAN system. The method for transmitting a frame in a wireless LAN system performed by a wireless device according to an exemplary embodiment of the present invention may include the steps of comparing a time parameter indicating a used time for a transmission performed by the wireless device with a predetermined admitted time, determining whether or not to transmit a first frame to an access point (AP) through an Enhanced Distributed Channel Access (EDCA), summing the time parameter and a first required time for transmitting the first frame, receiving a trigger frame for a multi-user uplink (MU UL) transmission from the AP, and performing data processing for a second frame being transmitted as a response to the trigger frame, wherein a second required time for a transmission of the second frame may not be summed with the time parameter.

BRIEF DESCRIPTION OF THE DRAWINGS

FIG. 1 is a conceptual view illustrating the structure of a wireless local area network.

DESCRIPTION OF EXEMPLARY EMBODIMENTS

Figure 2:
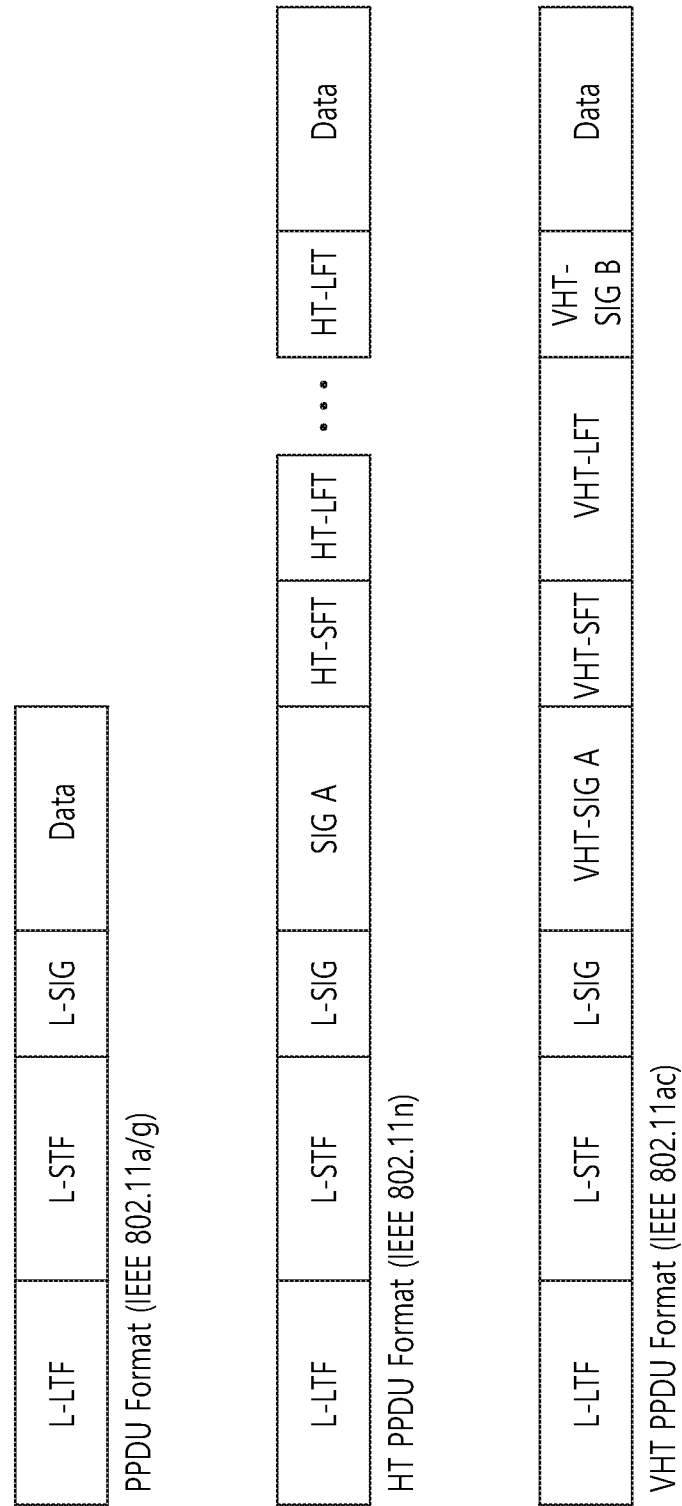
FIG. 2 is a diagram illustrating an example of a PPDU used in an IEEE standard.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also include complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1 (A) illustrates the structure of an infrastructure basic service set (BSS) of institute of electrical and electronic engineers (IEEE) 802.11.

Referring the FIG. 1 (A), the wireless LAN system 10 of the FIG. 1 (A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, the BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1 (A), a network between the APs 110 and 130 and a network between the APs 110 and 130 and the STAs 100-1, 105-1, and 105-2 may be implemented.

FIG. 1 (B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1 (B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
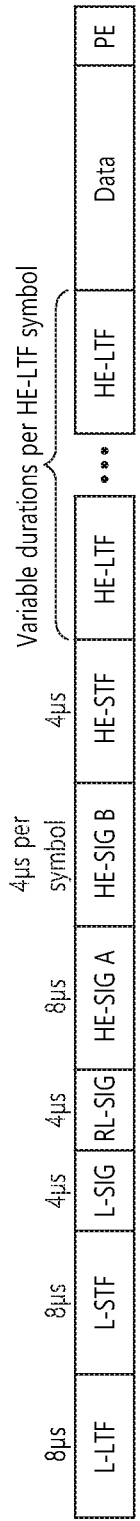
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs). More detailed description of the respective fields of FIG. 3 will be made below.

Figure 4:
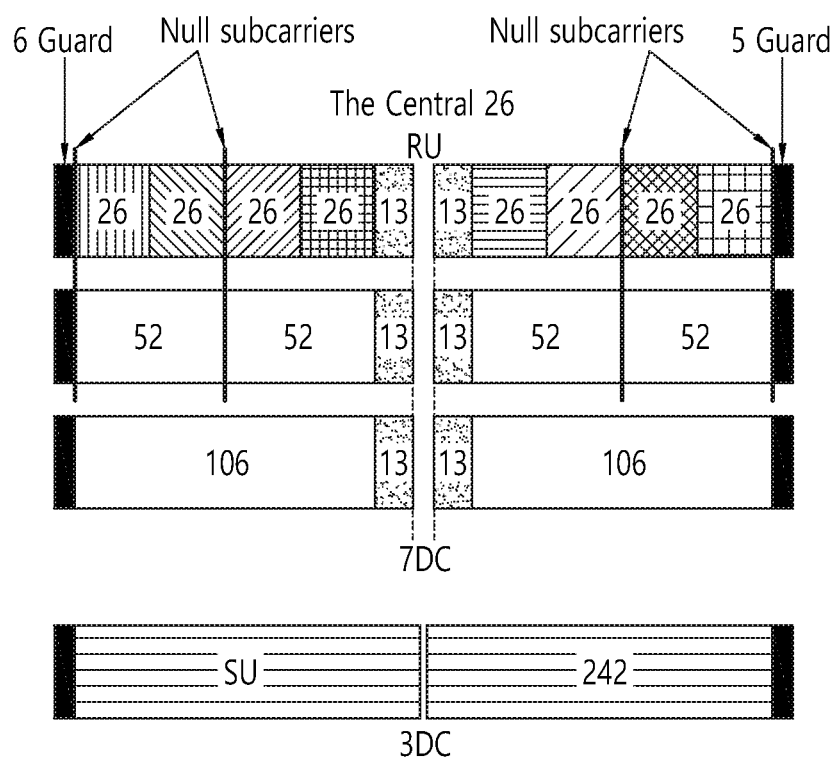
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
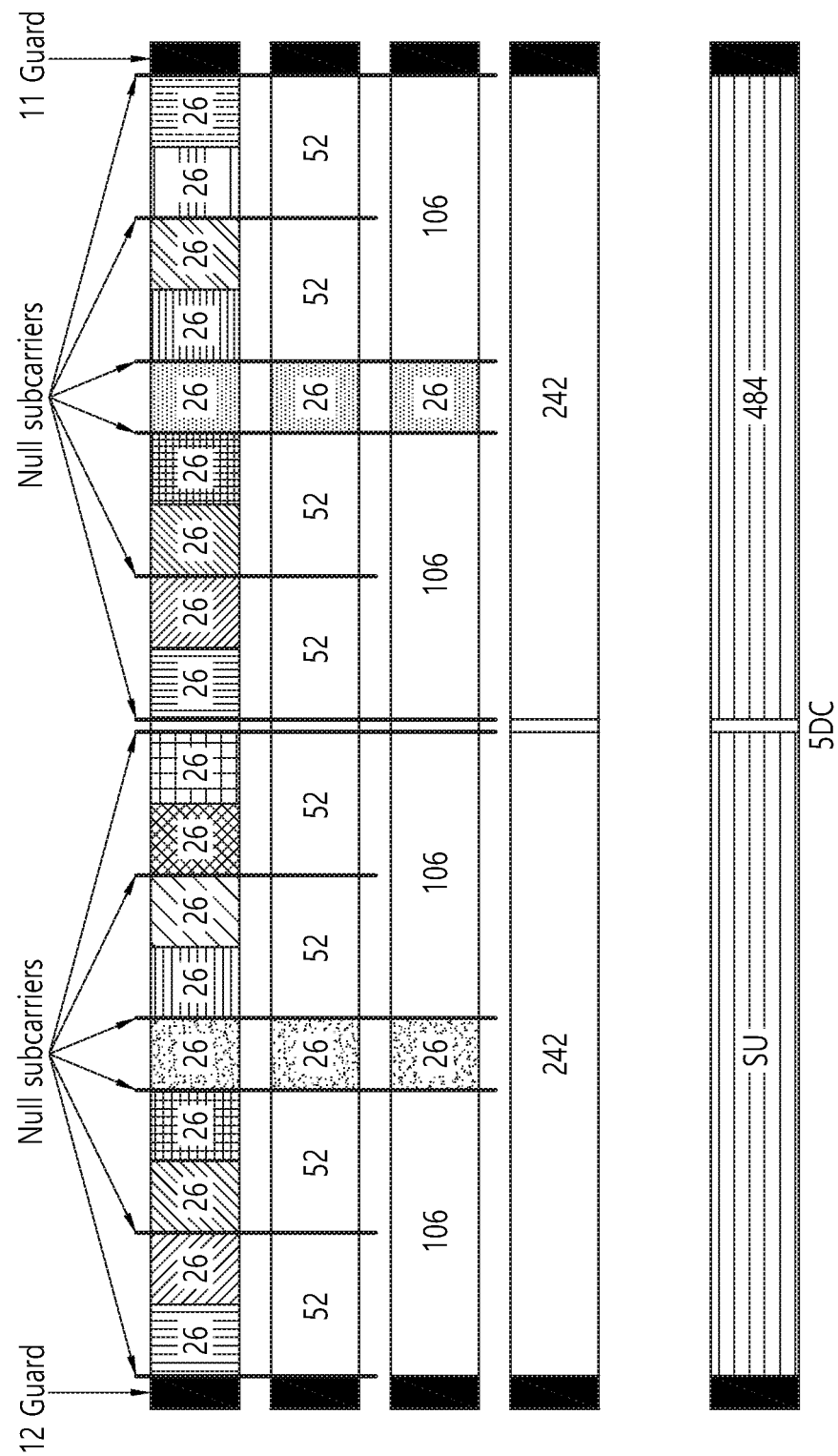
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
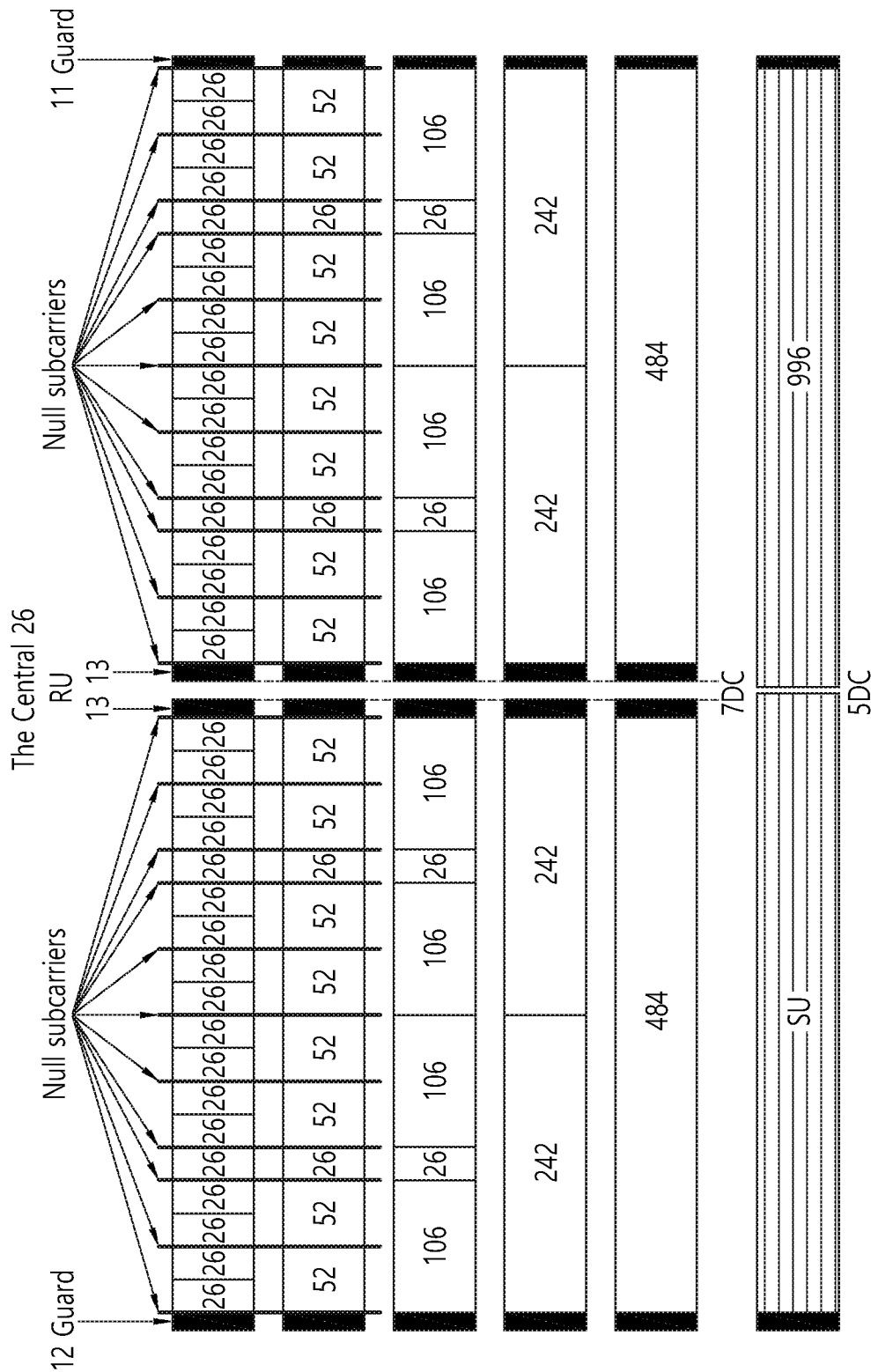
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
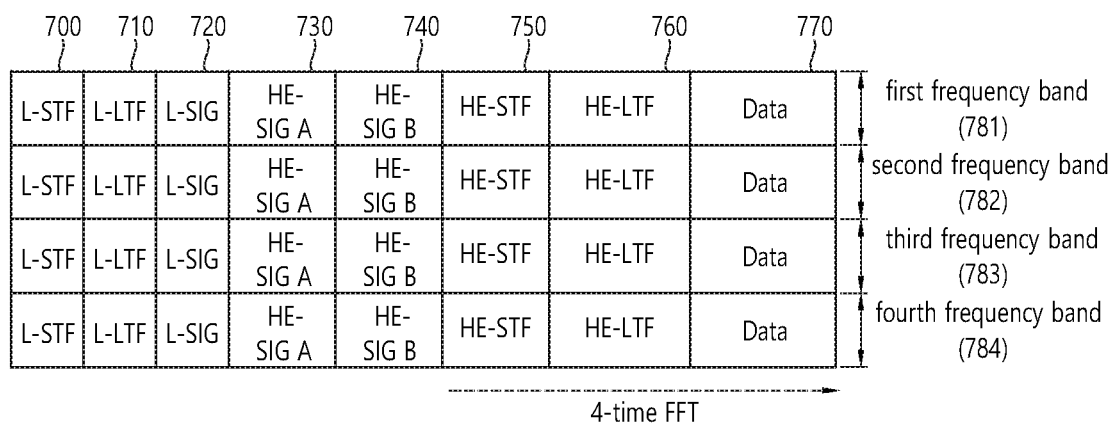
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame).

Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
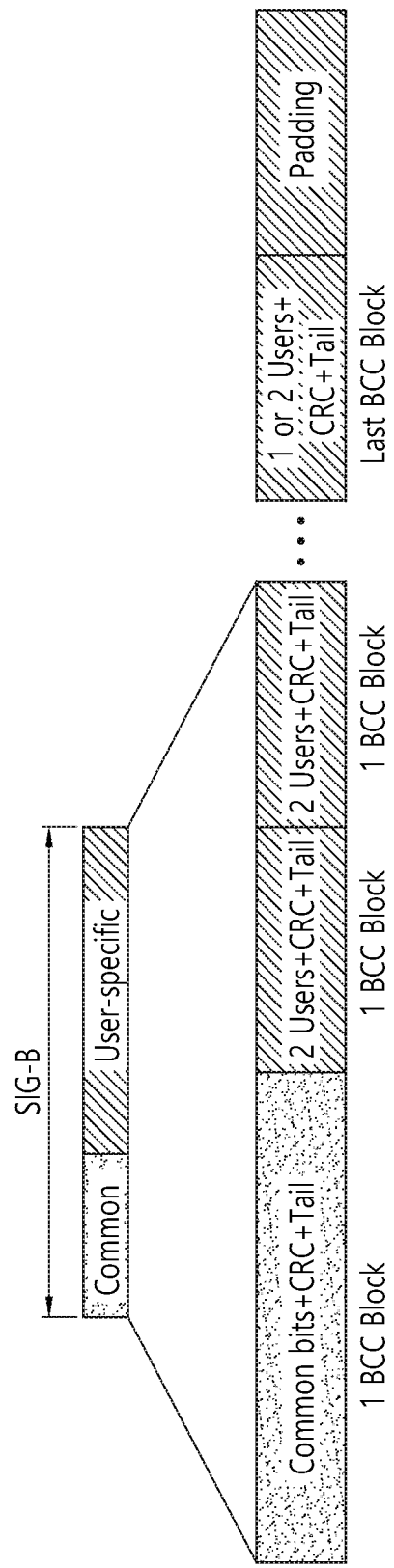
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
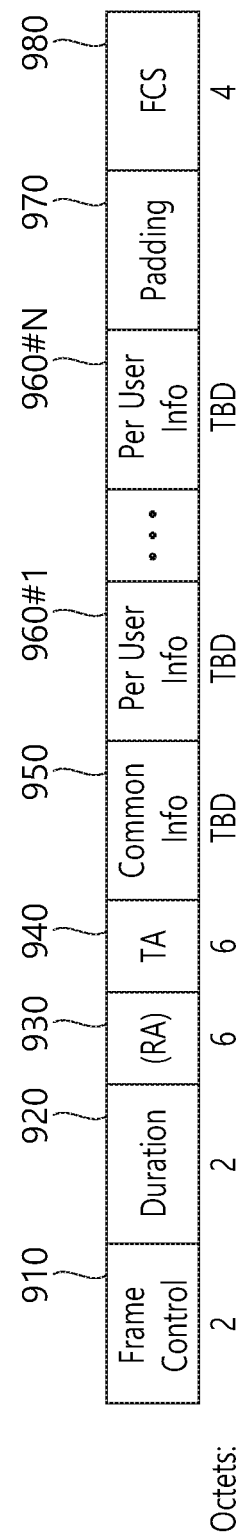
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960 #1 to 960 # N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960 #1 to 960 # N shown in FIG. 9 further includes multiple sub-fields.

Figure 10:
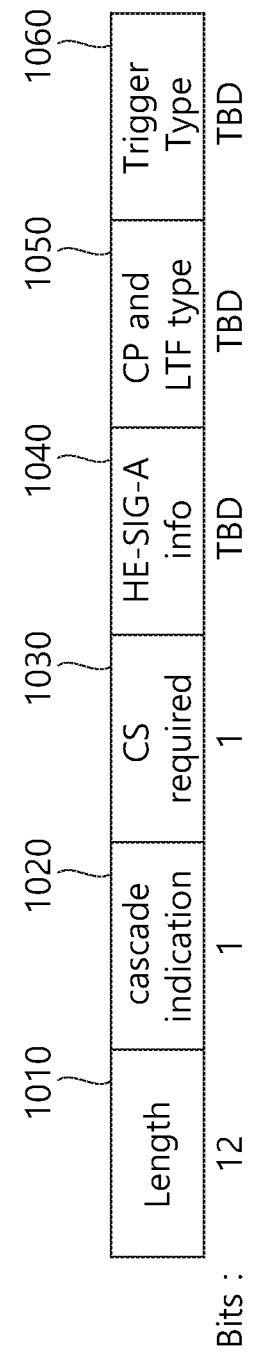
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
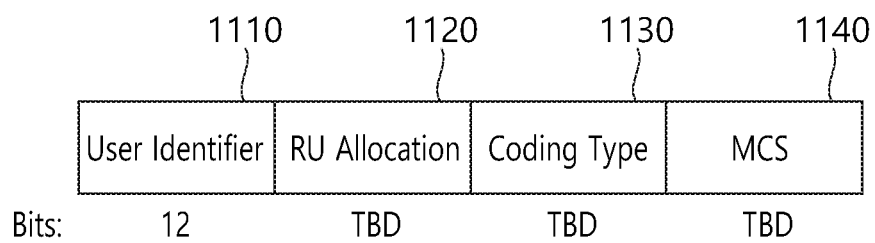
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

In the present specification, the user identifier field of FIG. 11 may be referred to as an association identifier (hereinafter, AID) field.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

For example, when BCC coding is applied to the uplink PPDU, the coding type field 1130 may be set to '1', and when the LDPC coding is applied, the coding type field 1130 may be set to '0'.

Figure 12:
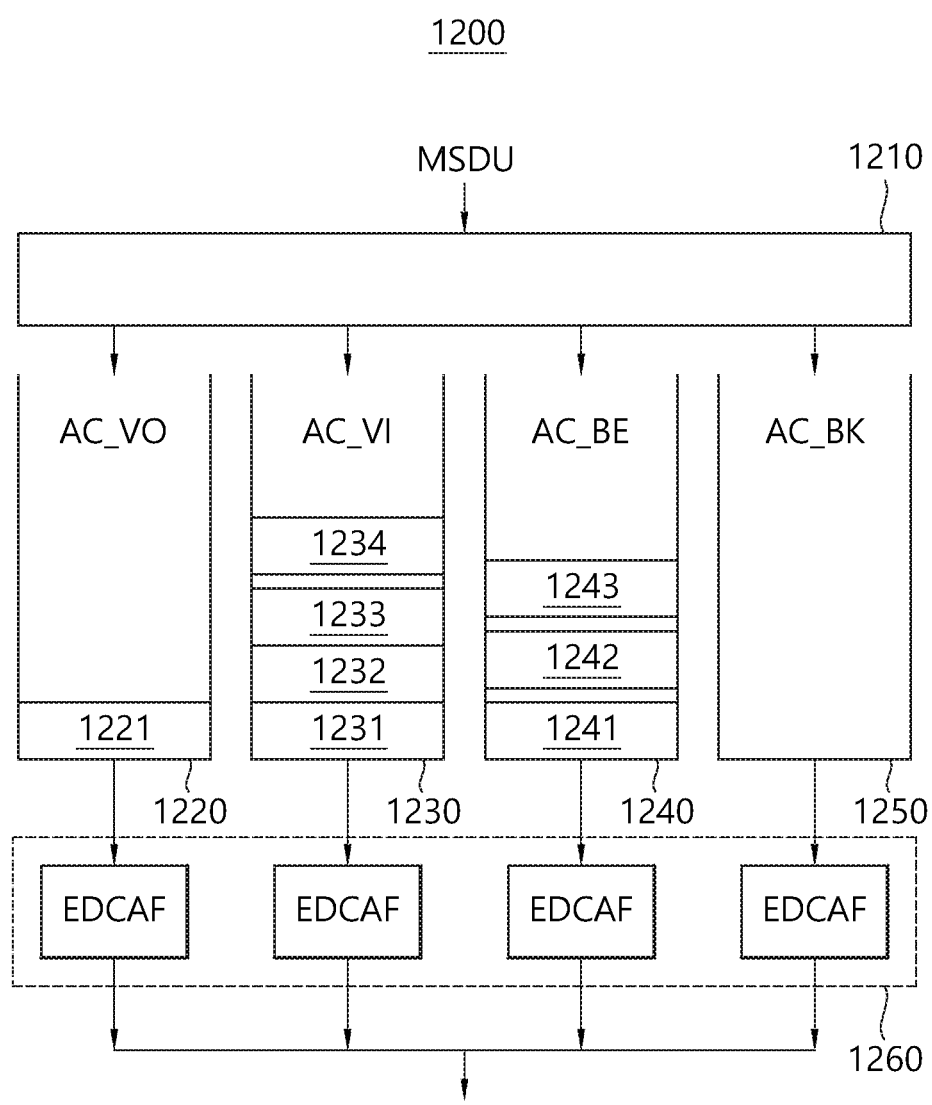
FIG. 12 is a diagram showing a conceptual view of an inside of an STA performing an EDCA procedure in a wireless LAN system according to an exemplary embodiment of the present invention.

FIG. 12 is a diagram showing a conceptual view of an inside of an STA performing an EDCA procedure in a wireless LAN system according to an exemplary embodiment of the present invention.

In a wireless LAN system, an STA (or AP) may perform an enhanced distributed channel access (EDCA) procedure based on a plurality of user priority levels predefined (or predetermined) for buffered traffic data. For example, the buffered traffic data may correspond to a Quality of Service (QoS) frame based on a plurality of user priority levels.

Four access categories (hereinafter referred to as 'AC's) for the EDCA procedure may be defined as background (AC_BK), best effort (AC_BE), video (AC_VI), and voice (AC_VO).

The STA performing the EDCA procedure may map traffic data, such as medium access control (MAC) service data unit (MSDU), which reaches a medium access control (MAC) layer from a logical link control (LLC) layer, to a specific AC, as shown below in Table 1. Table 1 is an exemplary table showing a mapping relation between user priority levels and ACs.

TABLE 1

| Priority level | User priority level | Access Category (AC) |
| --- | --- | --- |
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In this exemplary embodiment, a transmission queue and a channel access parameter set may be defined for each AC. A plurality of user priority levels may be configured based on the channel access parameter sets, which are configured differently for each AC.

In order to transmit a buffered frame to a transmission queue corresponding to each AC, the STA (or AP) may use a channel access parameter set (e.g., arbitration interframe space (AIFS)[AC], CWmin[AC], and CWmax[AC]) according to the exemplary embodiment of the present invention instead of the legacy parameter set (e.g., DCF interframe space (DIFS), CWmin, and CWmax) according to the legacy distributed coordination function (DCF).

An EDCA parameter set element may function as an important means that is used for differentiating channel access of the STA, which transmits QoS traffic having different user priority levels. For example, as values of AIFS [AC] and CWmin[AC] corresponding to each AC become smaller, since the delay time for channel access becomes shorted, differentiated user priority levels may be implemented accordingly.

For example, the EDCA parameter set element included in the beacon frame may include a channel access parameter set (i.e., AIFS [AC], CWmin[AC], CWmax[AC]) for each AC. As another example, the channel access parameter set that is used for each AC may be set as a default value.

In order to determine the traffic that is to be transmitted by the STA, a differentiated backoff procedure may be individually performed for each AC. Adequately setting up the channel access parameter set for each AC may optimize the performance and may enhance transmission performance in accordance with the priority level of the traffic at the same time.

In this specifically, the user priority level that is predefined for the traffic data (or traffic) may be referred to as a traffic identifier (hereinafter referred to as 'TID'). The transmission priority level of the traffic data may be determined based on the user priority level.

Referring to Table 1 which is presented above, the traffic ID (TID) of the traffic data having the highest user priority level may be set to '7'. More specifically, the traffic data having its traffic identifier set to '7' may be understood as the traffic having the highest transmission priority level.

Referring to FIG. 12, one STA (or AP) 1200 may include a virtual mapper 1210, a plurality of transmission queues 1220 to 1250, and a virtual collision handler 1260.

The virtual mapper 1210 of FIG. 12 may map an MSDU that is received from a logical link control (LLC) layer to transmission queues corresponding to each AC in accordance with the Table 1, which is presented above.

For example, the transmission queue 1220 of the AC_VO type of FIG. 12 may include one frame 1221 for a second STA (not shown). The transmission queue 1230 of the AC_VI type may include 3 frames 1231 to 1233 for a first STA (not shown) and one frame 1234 for a third STA (not shown) in accordance with a transmission order by which the frames are to be transmitted to a physical layer.

The transmission queue 1240 of the AC_BE type of FIG. 12 may include one frame 1241 for a second STA (not shown), one frame 1242 for a third STA (not shown), and one frame 1243 for a second STA (not shown) in accordance with a transmission order by which the frames are to be transmitted to a physical layer.

As an example, in case a buffered frame does not exist in the transmission queue 1250 of the AC_BK type of FIG. 12, the transmission queue 1250 of the AC_BK type may not include a frame that is to be transmitted to a physical layer.

The plurality of transmission queues 1220 to 1250 of FIG. 12 may operate as an individual contention entity of the EDCA procedure inside the STA in order to determine the traffic, which is to be transmitted through a wireless medium.

More specifically, the transmission queue 1220 of the AC_VO type, the transmission queue 1230 of the AC_VI type, and the transmission queue 1240 of the AC_BE type, wherein the buffered traffic exists in the transmission queues of FIG. 12, may each be understood as an individual contention entity of the EDCA procedure.

More specifically, the transmission queue 1220 of the AC_VO type, the transmission queue 1230 of the AC_VI type, and the transmission queue 1240 of the AC_BE type may each perform the EDCA procedure based on the channel access parameter set (i.e., AIFS [AC], CWmin[AC], CWmax[AC]) for each AC.

In this case, a specific transmission queue that has acquired channel access through the EDCA procedure inside the STA may be referred to as a primary AC. The traffic included in the primary AC may be transmitted to another entity (e.g., another STA or AP) during a transmission opportunity (hereinafter referred to as 'TXOP').

If two or more ACs each having completed the backoff procedure exist in the STA at the same time, collision between the ACs may be adjusted (or controlled) by the virtual collision handler 1260 within the STA.

For example, when collision between the ACs occurs, the frame that is buffered for the AC having the higher priority level may be transmitted firsthand. Additionally, other ACs may increase the contention window value and may update the values configured in a backoff count.

The TXOP may be started when the STA approaches (or access) a wireless medium based on the rules of the EDCA procedure. If two or more frames are included in one AC, and when a TXOP is acquired by the STA, the STA may attempt to transmit a plurality of frames through the MAC layer.

In a state when the STA has already completed the transmission of one frame, when it is determined that the STA may transmit a next frame existing in the same AC and receive its corresponding ACK during the remaining TXOP, the STA may attempt to perform the transmission of the next frame after one SIFS time interval.

A TXOP limit value may be set as a default value in the AP and the STA, and a frame that is related to the TXOP limit value may be transported (or delivered) to the STA from the AP. If a size of the data frame that is to be transmitted exceeds the TXOP limit value, the STA may perform fragmentation on the corresponding frame into a plurality of smaller frames. Subsequently, the fragmented frames may be transmitted within a range that does not exceed the TXOP limit value.

If collision occurs in a relation with another STA while the STA is transmitting a frame, a backoff procedure which generates a new backoff count of the STA may be understood based on the backoff procedure of a legacy DCF.

In other words, each STA may individually determine a frame that is to be transmitted from each STA through an internal backoff procedure that is related to a plurality of transmission queues within the STA. Each may configure a backoff time in the backoff counter for each STA based on the individually determined frames. Each STA may perform a contention-based backoff procedure with another STA based on the backoff counter. In this case, the STA that is the first to have the backoff time in its backoff counter to be equal to '0' may acquire the transmission opportunity (TXOP).

Figure 13:
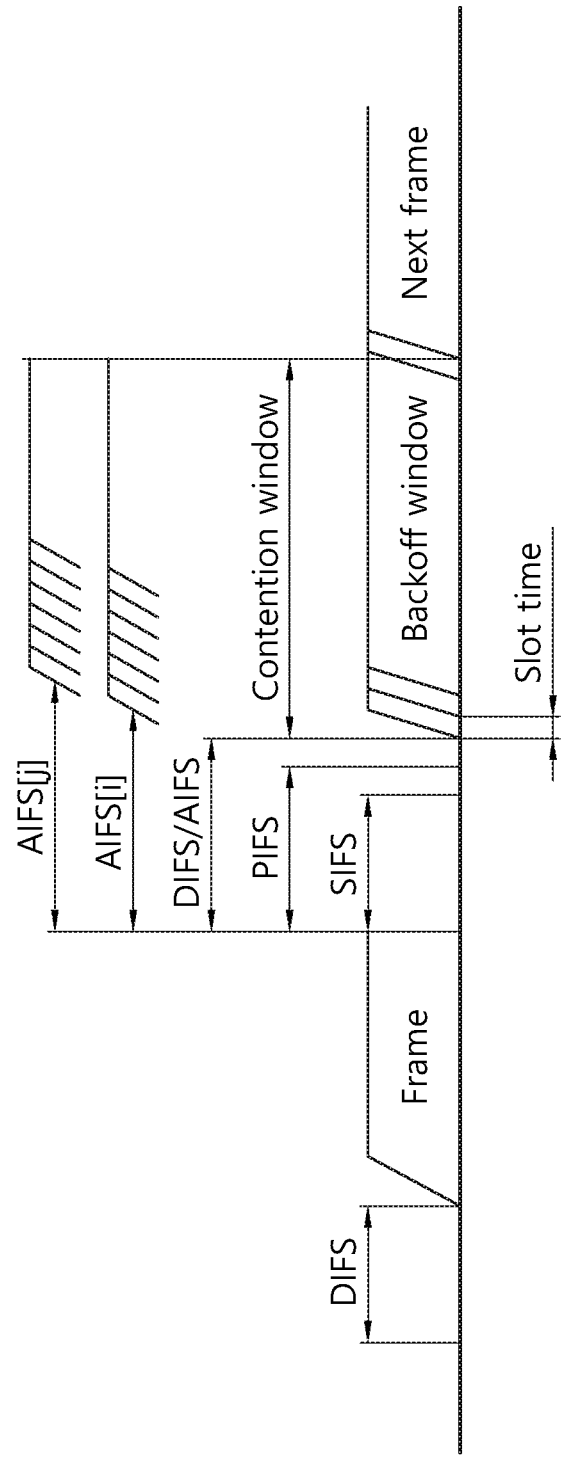
FIG. 13 is a conceptual diagram illustrating a backoff procedure according to an EDCA procedure according to an exemplary embodiment of the present invention.

FIG. 13 is a conceptual diagram illustrating a backoff procedure according to an EDCA procedure according to an exemplary embodiment of the present invention. Referring to FIG. 12 and FIG. 13, the traffic data (or traffic) may be transmitted in accordance with a contention-based EDCA procedure according to the corresponding user priority level. For example, the priority level that is assigned to each set of traffic data may be set to any one of the 8 user priority levels indicated in Table 1.

As described above, one STA (or AP) may include 4 output queues (i.e., transmission queues). Each transmission queue may perform a channel access operation in accordance with the rules of the EDCA procedure. Each transmission queue may transmit traffic data based on differentiated Arbitration Interframe Space (AIFS) values according to the user priority levels instead of the conventionally used DCF Interframe Space (DIFS).

In case traffic having different user priority levels are simultaneously transmitted from the STA (or AP), by adjusting the transmission so that the traffic having the higher user priority level is transmitted firsthand, the wireless LAN system may minimize collision occurring between the STAs.

In order to initiate (or start) the EDCA procedure, each STA (or AP) may set up a backoff time (Tb[i]) to a backoff timer. As a pseudo-random integer value, the backoff time (Tb[i]) may be calculated by using Equation 1 shown below.

$$T_b[i] = \text{Random}(i) \times \text{Slot Time} \quad \text{[Equation 1]}$$

Herein, Random(i) refers to a function using uniform distribution and generating a random integer between 0 and CW[i]. CW[i] corresponds to a contention window that is selected between a minimum contention window CWmin[i] and a maximum contention window CWmax[i]. i may indicate a user priority level of the traffic data.

When the STA performing the EDCA procedure transmits a frame, and when a re-transmission is requested due to a collision occurring in its relation with another STA. Equation 2 shown below may be used. More specifically, each time a collision occurs, a new contention window $CW_{new}[i]$ may be calculated by using a previous (or old) contention window $CW_{old}[i]$.

$$CW_{new}[i]=((CW_{old}[i]+1) \times PF)-1 \qquad \text{[Equation 2]}$$

Herein, a PF value may be calculated in accordance with a procedure that is defined in the IEEE 802.11e standard. The CWmin[i], CWmax[i], AIFS and PF values, which are included in the channel access parameter set, may each be set as a default value in each STA (or AP). Alternatively, the channel access parameter set may be received from the AP through a QoS parameter set element, which is included in a management frame or a beacon frame.

Hereinafter, in the exemplary embodiment of the present invention, the device may correspond to an apparatus that is capable of supporting both the wireless LAN system and the cellular system. More specifically, the device may be interpreted as a UE supporting the cellular system or as an STA supporting the wireless LAN system.

In this exemplary embodiment, the backoff procedure of the EDCA procedure may be performed based on Equation 1 and Equation 2, which are presented above.

For example, when the backoff procedure of the transmission queue 1230 of the AC_VI type is ended (or completed) firsthand, the transmission queue 1230 of the AC_VI type may acquire a transmission opportunity (hereinafter referred to as 'TXOP') allowing access to the wireless medium. The AP 1200 of FIG. 12 may determine the transmission queue 1230 of the AC_VI type as a primary AC and may determine the remaining transmission queues 1220, 1240, and 1250 as secondary ACs.

As described above, a process of performing a backoff procedure on the plurality of transmission queues 1220 to 1250 and determining the transmission queue having its backoff procedure completed firsthand as the primary AC may be referred to as a primary AC rule.

A transmission opportunity section for the transmission opportunities (TXOPs) may be determined based on the primary AC, which is determined in accordance with the above-described primary AC rule. Additionally, frames that are included in secondary ACs may also be transmitted in the transmission opportunity section, which is determined based on the primary AC.

Furthermore, in the wireless LAN system according to the exemplary embodiment of the present invention, the EDCA procedure of a user STA may be activated or deactivated. For example, whether or not the EDCA procedure is activated may be determined during an association step or a negotiation step. Alternatively, after determining whether or not the EDCA procedure is activated, the determined result may be signaled to the AP through a separate frame (e.g., OMI frame).

Figure 14:
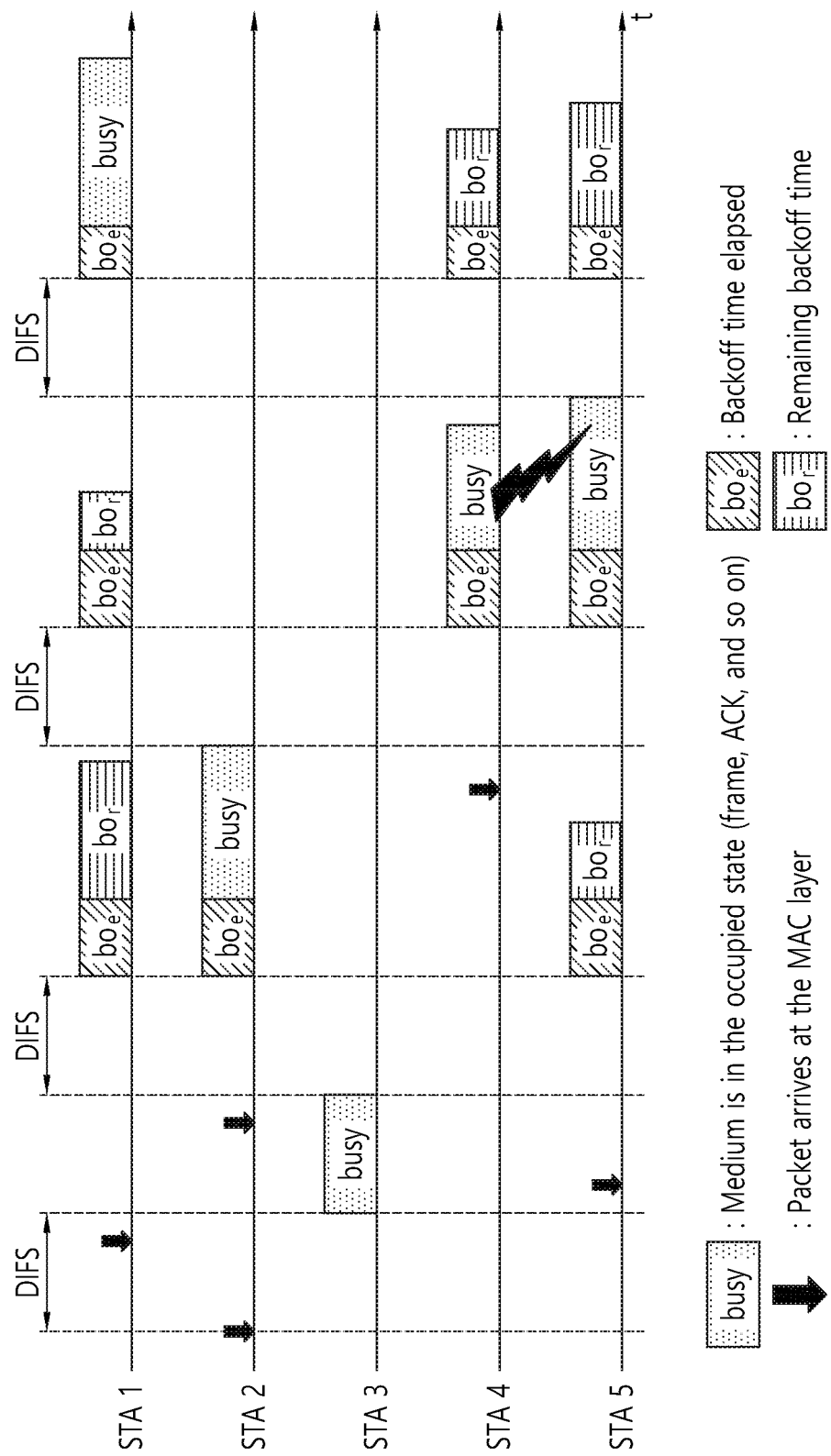
FIG. 14 is a diagram for describing a backoff cycle and a frame transmission procedure in a wireless LAN system of this specification.

FIG. 14 is a diagram for describing a backoff cycle and a frame transmission procedure in a wireless LAN system of this specification. Referring to FIG. 14, a horizontal axis t1 to t5 for each of first to fifth STAs 1410 to 1450 may represent a time axis. Also, a vertical axis for each of the first to fifth STAs 1410 to 1450 may represent a backoff time that is being transmitted.

Referring to FIG. 13 and FIG. 14, when a specific medium is shifted from an Occupied state (or Busy state) to an idle state, the plurality of STAs may attempt to transmit data (or frames).

At this point, as a solution for minimizing collision between the STAs, each STA may select a backoff time (Tb[i]) according to Equation 1 and may, then, attempt to perform transmission after standing-by (or waiting) for as long as slot times corresponding to the selected backoff time (Tb[i]).

When the backoff procedure is initiated, each STA may perform countdown of the selected backoff count time in slot time units. Each STA may continuously monitor the medium while performing the countdown. While monitoring the medium, if the medium is determined to be in an Occupied state, the STA may suspend the countdown and be on stand-by. While monitoring the medium, if the medium is determined to be in an Idle state, the STA may resume the countdown.

Referring to FIG. 14, when a frame for a third STA 1430 reaches a MAC layer of the third STA 1430, the third STA 1430 may verify whether or not the medium is in an Idle state during a DIFS. Subsequently, if it is determined that the medium is in an Idle state during a DIFS, the third STA 1430 may transmit a frame to an AP (not shown). Herein, although an inter frame space (IFS) of FIG. 14 is illustrated as a DIFS, it shall be understood that this specification will not be limited only to this.

While a frame is being transmitted from the third STA 1430, each of the remaining STAs may verify the Occupied state of the medium and may then be on stand-by during the transmission period of the frame. The frame may reach MAC layers corresponding to each of the first STA 1410, the second STA 1420, and the fifth STA 1450. When it is verified that the medium is in an Idle state, each STA may be on stand-by for as long as on DIFS and may, then, perform countdown of a backoff time, which is individually selected by each STA.

Referring to FIG. 14, the drawing shows an example, wherein the second STA 1420 selects a shortest backoff time (or a smallest backoff time value), and wherein the first STA 1410 selects a longest backoff time (or a largest backoff time value). At a transmission start point (T1) for transmitting a frame, after completing the backoff procedure corresponding to the backoff time, which is selected by the second STA 1420, FIG. 14 shows an example, wherein the remaining backoff time of the fifth STA 1450 is shorter than the remaining backoff time of the first STA 1410.

When the medium is occupied by the second STA 1420, the first STA 1410 and the fifth STA 1450 may suspend their backoff procedures and may be on stand-by. Thereafter, when the medium occupation of the second STA 1420 is completed (or ended) (i.e., if the medium returns to the Idle state), the first STA 1410 and the fifth STA 1450 may be on stand-by for as long as a DIFS.

Subsequently, the first STA 1410 and the fifth STA 1450 may resume their backoff procedures, which were suspended earlier, based on the remaining backoff time. In this case, since the remaining backoff time of the fifth STA 1450 is shorter than the remaining backoff time of the first STA 1410, the fifth STA 1450 may complete its backoff procedure earlier than the first STA 1410.

Meanwhile, referring to FIG. 14, when the medium is occupied by the second STA 1420, a frame for the fourth STA 1440 may reach a MAC layer of the fourth STA 1440. When the medium returns to its Idle state, the fourth STA 1440 may be on stand-by for as long as a DIFS. Thereafter, the fourth STA 1440 may perform countdown of a backoff time, which is selected by the fourth STA 1440.

Referring to FIG. 14, the remaining backoff time of the fifth STA 1450 may coincidently be identical to the backoff time of the fourth STA 1440. In this case, collision may occur between the fourth STA 1440 and the fifth STA 1450. When a collision occurs between the STAs, both the fourth STA 1440 and the fifth STA 1450 may become incapable of receiving ACKs and may also fail to perform data transmission.

Accordingly, the fourth STA 1440 and the fifth STA 1450 may individually calculate a new contention window ($CW_{new}[i]$) according to Equation 2, which is presented above. Subsequently, the fourth STA 1440 and the fifth STA 1450 may individually perform countdown of the backoff time, which is newly calculated in accordance with Equation 2.

Meanwhile, when the medium is in an Occupied state due to the transmission performed by the fourth STA 1440 and the fifth STA 1450, the first STA 1410 may be on stand-by. Subsequently, when the medium returns to the Idle state, the first STA 1410 may be on stand-by for as long as a DIFS and may, then, resume the backoff counting. When the remaining backoff time of the first STA 1410 is elapsed, the first STA 1410 may transmit a frame.

A CSMA/CA mechanism may also include virtual carrier sensing in addition to physical carrier sensing, wherein the AP and/or STA directly senses the medium.

Virtual carrier sensing is performed to compensate problems that may occur during medium access, such as a hidden node problem, and so on. In order to perform virtual carrier sensing, a MAC of the WLAN system uses a Network Allocation Vector (NAV). The NAV corresponds to a value that is indicated by an AP and/or an STA that is currently using the medium or that has the authority to use the medium to another AP and/or STA, wherein the value indicates the time remaining until the medium returns to its state of being available for usage.

Accordingly, a value that is set as the NAV corresponds to a time period during which the usage of the medium is scheduled by the AP and/or STA, which transmits the corresponding frame, and the STA receiving the NAV value is prohibited from accessing the medium during the corresponding time period.

Figure 15:
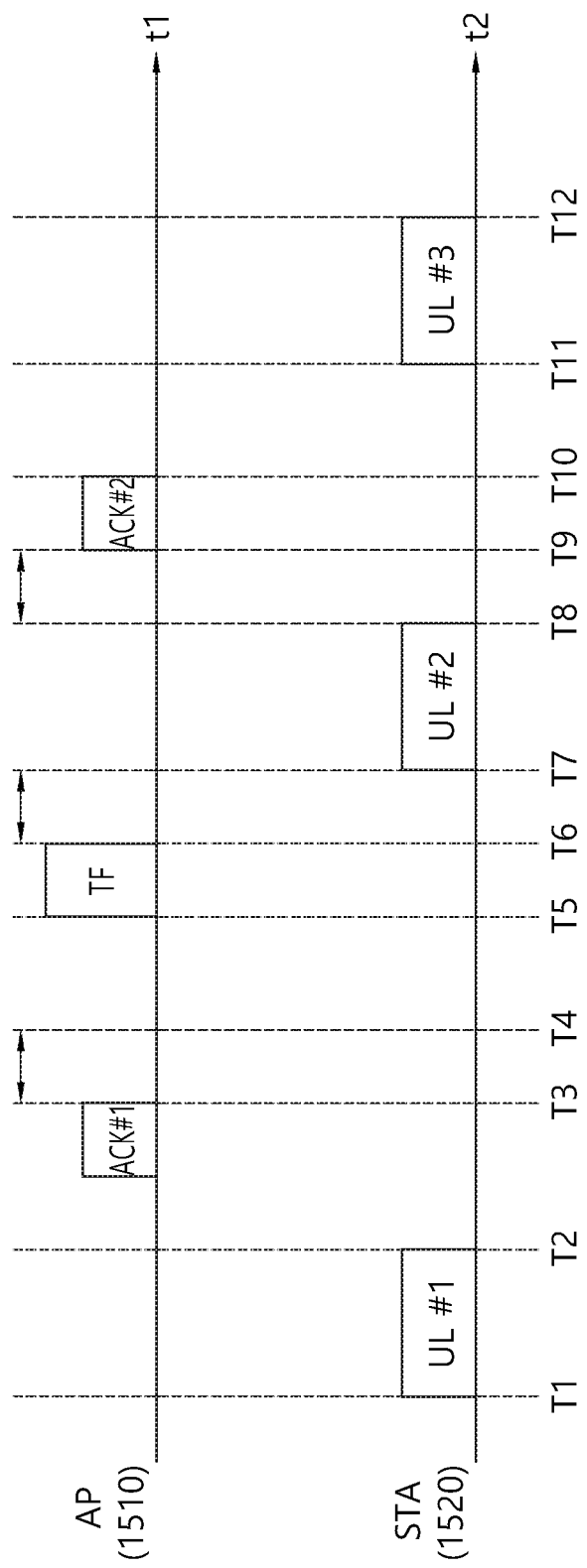
FIG. 15 is a diagram illustrating a method for transmitting a frame in a wireless LAN system that is performed by a wireless device according to an exemplary embodiment of the present invention.

FIG. 15 is a diagram illustrating a method for transmitting a frame in a wireless LAN system that is performed by a wireless device according to an exemplary embodiment of the present invention.

Referring to FIG. 1 to FIG. 15, a horizontal axis of an AP 1510 shown in FIG. 15 represents time (t1), and a vertical axis may be associated with the existence (or presence) of a frame that is being transmitted from the AP 1510.

A horizontal axis of an STA 1520 shown in FIG. 15 represents time (t2), and a vertical axis may be associated with the existence (or presence) of a frame that is being transmitted from the STA 1520. Also, the STA 1520 may be understood as a receiving device of a trigger frame, having a plurality of resource units for the uplink transmission performed by a plurality of user STAs individually allocated thereto.

The STA 1520 according to the exemplary embodiment of the present invention may maintain two parameters (used_time, admitted_time) for each AC (AC_VO, AC_VI, AC_BE, AC_BK) shown in FIG. 12.

For example, the STA 1520 may maintain a plurality of first time parameters corresponding to the admitted time (admitted_time) for each AC (AC VO, AC VI, ACBE, AC BK) and a plurality of second time parameters corresponding to the used time (used_time) for each AC (AC VO, AC VI, AC BE, AC BK).

For example, the plurality of first time parameters may be understood as a concept including a first time parameter for the admitted_time of AC_VO, a first time parameter for the admitted_time of AC_VI, a first time parameter for the admitted_time of AC_BE, and a first time parameter for the admitted_time of AC_BK.

Similarly, the plurality of second time parameters may be understood as a concept including a second time parameter for the used_time of AC_VO, a second time parameter for the used_time of AC_VI, a second time parameter for the used_time of AC_BE, and a second time parameter for the used_time of AC_BK.

In order to allow a frame to be transmitted through/based on a contention-based EDCA, which is described above in FIG. 12 to FIG. 14 (i.e., when the STA intends to transmit traffic data included in a specific AC among the 4 ACs), the STA 1520 of FIG. 15 may compare the first time parameter for an AC of a corresponding frame with the second time parameter for the AC of the corresponding frame.

For example, the plurality of first time parameters related to the admitted_time and the plurality of second time parameters related to the used_time may be set to initial values (e.g., '0') during an association (or re-association) step between the user STA and the AP.

The plurality of first time parameters related to the admitted_time may be understood as values that are predetermined by the AP. More specifically, the plurality of first time parameters related to the admitted_time may be calculated based on Equation 3 shown below.

$$\text{admitted\_time} = \text{admitted\_time}' + 11\text{EDCAAveragingPeriod} \times \text{mediumtime of TSPEC} \quad \text{[Equation 3]}$$

For example, a value that is set as an admitted_time' may indicate an admitted time, which was previously admitted (until the current time) by the AP for the user STA for each AC. Additionally, referring to Equation 3, which is presented above, a value corresponding to 11EDCAAveragingPeriod and a value corresponding to a medium time of TSPEC may correspond to values that are set in a session forming step based on an add traffic stream (ADDTS) response frame, which is received from the AP.

More specifically, the add traffic stream (ADDTS) response frame may correspond to a frame that is received as a response to an ADDTS request frame, which is transmitted by the user STA for the session formation of the user STA.

A traffic specification (TSPEC) element may be included in an add traffic stream (ADDTS) response frame. A value corresponding to a medium time of the TSPEC may be set up for each AC based on the traffic specification (TSPEC) element.

A more detailed description of the ADDTS request frame and the ADDTA response frame is provided in Section 10.22.4.2.3 of the standard document IEEE P802.11ax/D1.1, which was disclosed in February 2017, and in Section 9.6.3.3.1 of IEEE Draft P802.11-REVmc™/D8.0, which was disclosed in August 2016.

The plurality of second time parameters related to the used_time may indicate the time that is used for the transmission performed by the user STA. The plurality of second time parameters related to the used_time may be calculated based on Equation 4 shown below.

$$\text{used\_time} = \text{used\_time}' + \text{MPDUExchangeTime} \quad \text{[Equation 4]}$$

For example, a value that is set as a used_time' may indicate a used time, which was previously used (until the current time) by the user STA for each AC.

Additionally, referring to Equation 4, a value that is set as MPDUExchangeTime may be understood as a summed value of a first processing time that is required for the transmission of a frame corresponding to a specific AC that is currently scheduled to be transmitted, a second processing time that is required for the reception of an acknowledgement frame for a frame corresponding to a specific AC that is currently scheduled to be transmitted, and a time corresponding to a SIFS.

Additionally, regardless of whether or not the transmission of a frame corresponding to a specific AC that is currently scheduled to be transmitted is successful, by summing (or adding) a used_time' with a value set to MPDUExchangeTime for the specific AC according to Equation 4, the user STA may update the second time parameter corresponding to the used_time of the specific AC.

In order to transmit the frame corresponding to the specific AC through/based on the EDCA, the STA 1520 according to the exemplary embodiment of the present invention may compare the first time parameter related to the admitted_time of the specific AC with the second time parameter related to the used_time of the specific AC.

For example, if the second time parameter related to the used_time of the specific AC does not exceed the first time parameter related to the admitted_time of the specific AC, the STA 1520 may transmit a frame related to the specific AC through/based on the EDCA to the AP 1510.

As another example, if the second time parameter related to the used_time of the specific AC exceeds the first time parameter related to the admitted_time of the specific AC, the STA 1520 may not transmit a frame related to the specific AC.

Even if the STA 1520 according to the exemplary embodiment of the present invention acquires a transmission opportunity (TXOP) for transmitting a frame included in the specific AC through/based on the EDCA, if the second time parameter of the specific AC exceeds the first time parameter of the specific AC, the STA 1520 may withdraw (or abandon) the transmission of the frame included in the specific AC for which it has acquired the transmission opportunity (TXOP).

Hereinafter, an exemplary embodiment including a case when a frame is being transmitted through/based on the EDCA and a case when a frame is being transmitted based on a trigger frame will be described in detail with reference to FIG. 15.

In a first period T1 to T2 of FIG. 15, the STA 1520 may be understood as a wireless device that has acquired a transmission opportunity (TXOP) for a specific AC (e.g., AC_VO) through/based on a contention-based EDCA procedure with another STA (not shown) and the AP 1510. For example, a first uplink frame (UL #1) of FIG. 15 may be understood as a frame included in AC_VO shown in FIG. 12.

During the first period T1 to T2, the STA 1520 may compare a second time parameter that is maintained for a specific AC (i.e., AC_VO) with a first time parameter related to an admitted_time that is predetermined for a specific AC (i.e., AC_VO). Then, the STA 1520 may determine whether or not to transmit the first uplink frame (UL #1).

For a brief description of FIG. 15, during the first period T1 to T2, it may be assumed that a value of the second time period being maintained for the specific AC (i.e., AC_VO) is smaller than a value of the first time parameter.

According to the assumption presented above, during the first period T1 to T2, the STA 1520 of FIG. 15 may transmit a first uplink frame (UL #1) to the AP 1510 through/based on the EDCA. For example, the first uplink frame (UL #1) may correspond to a QoS data frame or a QoS Null frame.

A second period T2 to T3 may be understood as a period being request for the reception of an acknowledgement frame (ACK #1) related to the first uplink frame (UL #1).

A third period T3 to T4 may correspond to a SIFS.

During the first period T1 to T2 to the third period T3 to T4, regardless of the reception or non-reception of the acknowledgement frame (ACK #1) (i.e., regardless of the success or failure in the transmission of the first uplink frame (UL #1)), a second time parameter related to the used time of a specific AC (i.e., AC_VO) may be newly calculated based on Equation 4, which is presented above.

More specifically, by summing (or adding) the previously used time (used_time') of the specific AC (i.e., AC_VO) and a MPDUExchangeTime related to the first uplink frame (UL #1) based on Equation 4, which is presented above, a second time parameter of the specific AC (i.e., AC_VO) may be newly calculated.

For example, a value of the MPDUExchangeTime related to the first uplink frame (UL #1) may be set as a summed value of a first processing time (i.e., T1 to T2 of FIG. 15) being required for the transmission of the first uplink frame (UL #1), a second processing time (i.e., T2 to T3 of FIG. 15) being required for the reception of the acknowledgement frame (ACK #1), and a SIFS (i.e., T3 to T4 of FIG. 15).

During a fourth period T4 to T5, for example, the AP 1510 and the 1520 may be on stand-by.

During a fifth period T5 to T6, the STA 1520 may receive a trigger frame (TF) for a Multi-User Uplink transmission from the AP 1510. For example, an uplink Resource Unit for the STA 1520 may be included in the trigger frame (TF).

A sixth period T6 to T7 may correspond to a SIFS.

During a seventh period T7 to T8, the STA 1520 may transmit a trigger-based uplink frame (UL #2) to the AP 1510 as a response to the trigger frame (TF). For example, the trigger-based uplink frame (UL #2) may be understood as a frame included in the above-described AC_VO shown in FIG. 12.

According to the exemplary embodiment of the present invention, for the transmission of the trigger-based uplink frame (UL #2), a second time parameter related to the used_time of the specific AC (i.e., AC_VO) may not be newly calculated.

More specifically, the STA 1520 may not sum (or add) the previously used time (used_time') of the specific AC (i.e., AC_VO) and the MPDUExchangeTime related to the trigger-based uplink frame (UL #2). In other words, in case of transmitting the trigger-based uplink frame (UL #2), the MPDUExchangeTime of Equation 4 may not be considered.

According to the exemplary embodiment of the present invention, the trigger-based uplink frame (UL #2) may be transmitted regardless of a comparison result between a value of a second time parameter related to the previously used time (used_time') of the specific AC (i.e., AC_VO) and a value of a first time parameter related to the admitted_time of the specific AC (i.e., AC_VO) (i.e., even if the second time parameter exceeds the first time parameter).

An eighth period T8 to T9 may correspond to a SIFS.

During a ninth period T9 to T10, the STA 1520 may receive an acknowledgement frame (ACK #2) for notifying the successful reception of the trigger-based uplink frame (UL #2) from the AP 1510.

For example, in case of the transmission of the trigger-based uplink frame (UL #2), the period related to the MPDUExchangeTime of Equation 4 may be understood as the seventh period T7 to T8 to the ninth period T9 to T10.

However, as described above, in case of the transmission of the trigger-based uplink frame (UL #2), the value related to the seventh period T7 to T8 to the ninth period T9 to T10 (i.e., MPDUExchangeTime) is not added to the previously used time (used_time') of the specific AC (i.e., AC_VO) in accordance with Equation 4.

Additionally, in case of the transmission of the trigger-based uplink frame (UL #2), the value related to the seventh period T7 to T8 to the ninth period T9 to T10 (i.e., MPDUExchangeTime) is merely exemplary. And, therefore, it should be understood that the present invention will not be limited only to this.

More specifically, in case of the transmission of the trigger-based uplink frame (UL #2), the MPDUExchangeTime of Equation 4 may indicate a time corresponding to a period that is related to the transmission of the trigger-based uplink frame (UL #2).

As another example, in case of the transmission of the trigger-based uplink frame (UL #2), it may be understood that a value corresponding to a summed value of the seventh period T7 to T8 to the ninth period T9 to T10 and the SIFS may be set as the MPDUExchangeTime of Equation 4.

Additionally, the acknowledgement frame (ACK #2) of FIG. 15 may correspond to a frame being transmitted to a plurality of STAs for notifying successful reception of a plurality of uplink frames being respectively transmitted from the plurality of STAs.

During a tenth period T10 to T11, for example, the AP 1510 and the 1520 may be on stand-by.

In an eleventh period T11 to T12, the STA 1520 may be understood as a wireless device that has acquired a transmission opportunity (TXOP) for a specific AC (e.g., AC_VO) through/based on a contention-based EDCA procedure with another STA (not shown) and the AP 1510. For example, a third uplink frame (UL #3) of FIG. 15 may be understood as a frame included in AC_VO shown in FIG. 12.

During the eleventh period T11 to T12, the STA 1520 may compare a second time parameter of the specific AC (i.e., AC_VO), which is newly calculated during the process of transmitting the first uplink frame (UL #1), with a first time parameter corresponding to the admitted_time of the specific AC (i.e., AC_VO), and the STA 1520 may, then, determine whether or not to transmit a third uplink frame (UL #3).

Figure 16:
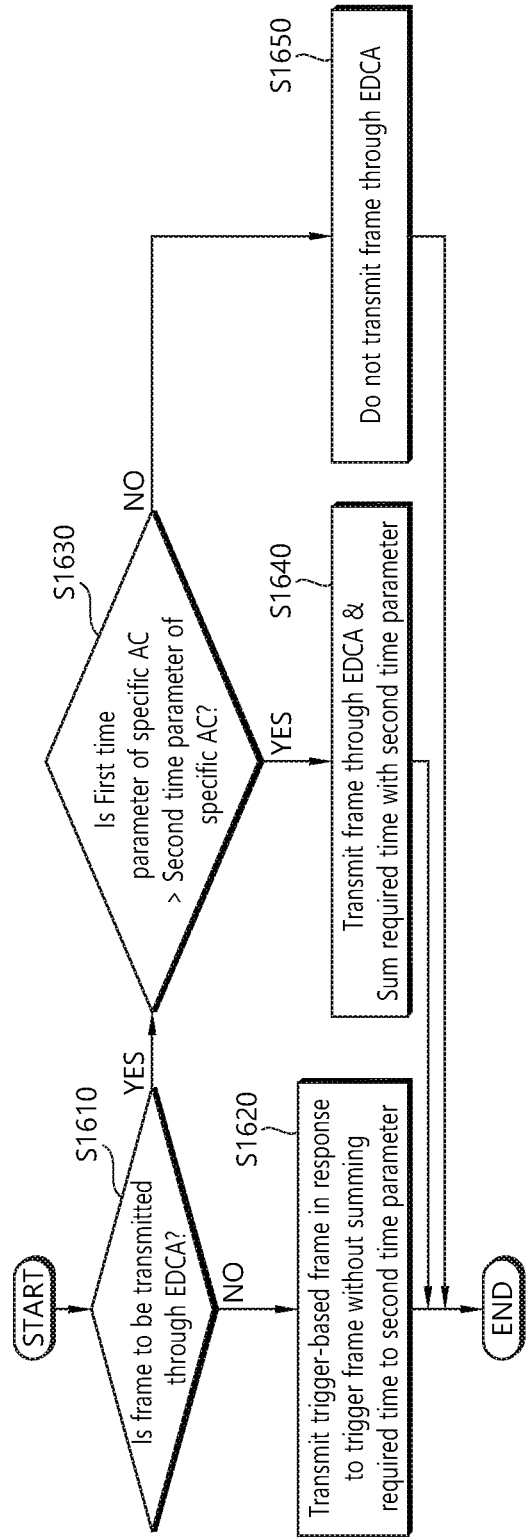
FIG. 16 is a flow chart illustrating a method for transmitting a frame in a wireless LAN system that is performed by a wireless device according to an exemplary embodiment of the present invention.

FIG. 16 is a flow chart illustrating a method for transmitting a frame in a wireless LAN system that is performed by a wireless device according to an exemplary embodiment of the present invention.

Referring to FIG. 1 to FIG. 16, in step S1610, the user STA may determine whether or not a frame that is to be transmitted corresponds to a frame that is to be transmitted through/based on the EDCA.

In step S1610, when it is determined that the frame that is to be transmitted by the user STA does not correspond to a frame that is to be transmitted through/based on the EDCA, step S1620 may be performed.

In step S1620, the frame that is to be transmitted may be understood as a trigger-based frame, which corresponds to a response to a trigger frame for a multi-user uplink (MU UL) transmission, which is received from the AP.

In step S1620, when a trigger-based frame is transmitted, the user STA may not add (or sum) a required time for the trigger-based frame to the second time parameter which indicates an amount of the previously used time (used_time') having been used for transmission of frames related to the specific AC, in accordance with Equation 4.

More specifically, when a trigger-based frame is transmitted, the second time parameter related to the used time (used_time) of the specific AC is not updated, and the user STA may maintain the value related to the previously used time (used_time') of the specific AC as the second time parameter.

Additionally, the user STA may compare the first time parameter related to the admitted_time of the specific AC with the second time parameter related to the used_time of specific AC. And, then, regardless of the comparison result (i.e., even if the second time parameter of the specific AC exceeds the first time parameter of the specific AC), the user STA may transmit a trigger-based frame as a response to the received trigger frame.

In step S1610, when it is determined that the frame that is to be transmitted by the user STA corresponds to a frame that is to be transmitted based on the EDCA, step S1630 may be performed.

In step S1630, the user STA may compare a first time parameter related to the admitted time of the specific AC of a frame that is to be transmitted through/based on the EDCA with a second time parameter related to the used time of the specific AC. In this case, the user STA may be understood as a wireless device that has acquired a transmission opportunity (TXOP) for a specific AC through/based on a contention-based EDCA procedure with another STA and the AP.

In step S1630, if the second time parameter, which has been maintained as a previous value for the specific AC, does not exceed the first time parameter for the specific AC, step S1640 may be performed.

In step S1640, the user STA may transmit a frame of the specific AC to the AP through/based on the EDCA.

Moreover, by adding (or summing) the second time parameter, which has been maintained as a previous value for the specific AC, and a required time for the frame of the specific AC, which is transmitted through/based on the EDCA, according to Equation 4 presented above, the user STA may newly calculate (or update) the second time parameter related to the used_time of the specific AC.

For example, the required time for the frame of the specific AC, which is transmitted through/based on the EDCA, may correspond to a summed value of a first processing time being required for the transmission of a sequence included in the frame that is to be transmitted through/based on the EDCA, a second processing time being required for the reception of an acknowledgement frame for the frame that is to be transmitted through/based on the EDCA, and a time corresponding to Short-Inter Frame Spacing (SIFS).

In steps S1630, if the second time parameter for the specific AC, exceeds the first time parameter for the specific AC, step S1650 may be performed. In step S1650, the user STA cannot transmit the corresponding frame through/based on the EDCA.

According to the wireless LAN system, which is described above in this specification, when performing frame transmission, the process that is performed based on the EDCA and the process that is performed based on the trigger frame may be considered and understood as processes each being independent from one another.

More specifically, in the wireless LAN system according to the exemplary embodiment of the present invention, when performing transmission of a trigger frame, due to an influence caused by the process being performed based on the EDCA, failure in the transmission of a trigger-based frame may be reduced.

Furthermore, when performing transmission through/based on the EDCA, due to an influence caused by the process being performed based on the trigger frame, failure in the transmission that is performed based on the EDCA may be reduced. Thus, according to the exemplary embodiment of the present invention, a wireless LAN system having an enhanced performance may be provided.

Figure 17:
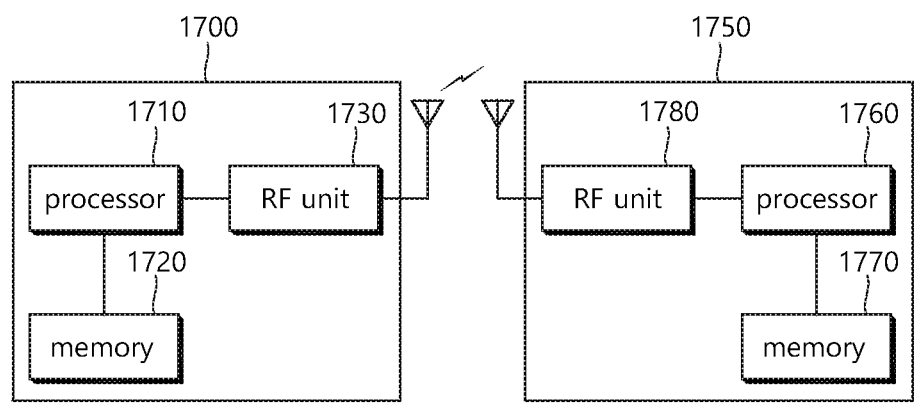
FIG. 17 is a block view illustrating a wireless device to which the exemplary embodiment of the present invention can be applied.

FIG. 17 is a block view illustrating a wireless device to which the exemplary embodiment of the present invention can be applied.

Referring to FIG. 17, as an STA that can implement the above-described exemplary embodiment, the wireless device may correspond to an AP or a non-AP station (STA). The wireless device may correspond to the above-described user or may correspond to a transmitting device transmitting a signal to the user.

The AP 1700 includes a processor 1710, a memory 1720, and a radio frequency (RF) unit 1730.

The RF unit 1730 is connected to the processor 1710, thereby being capable of transmitting and/or receiving radio signals.

The processor 1710 implements the functions, processes, and/or methods proposed in the present invention. For example, the processor 1710 may be implemented to perform the operations according to the above-described exemplary embodiments of the present invention. More specifically, among the operations that are disclosed in the exemplary embodiments of FIG. 1 to FIG. 16, the processor 1710 may perform the operations that may be performed by the AP.

The non-AP STA 1750 includes a processor 1760, a memory 1770, and a radio frequency (RF) unit 1780.

The RF unit 1780 is connected to the processor 1760, thereby being capable of transmitting and/or receiving radio signals.

The processor 1760 implements the functions, processes, and/or methods proposed in the present invention. For example, the processor 1760 may be implemented to perform the operations of the non-AP STA according to the above-described exemplary embodiments of the present invention. The processor may perform the operations of the non-AP STA, which are disclosed in the exemplary embodiments of FIG. 1 to FIG. 16.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1710 and 1760 through a diversity of well-known means.

As described above, according to the exemplary embodiment of this specification, a method of transmitting a frame in a wireless LAN system having a more enhanced performance and a wireless device using the same may be provided.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for transmitting a frame in a wireless local area network (WLAN), the method comprising:

for a first frame belonging to an access category (AC), comparing, by a first wireless device, a first time parameter related to an admitted time being set for the AC with a second time parameter related to an amount of time having been used for transmission of frames belonging to the AC;

based on the comparison between the first time parameter and the second time parameter, transmitting, by the first wireless device, the first frame to a second wireless device;

after the transmission of the first frame, updating, by the first wireless device, the second time parameter, wherein the updated second time parameter is related to a sum of the second time parameter and a first required time used for transmitting the first frame; and for a second frame solicited by a trigger frame received from the second wireless device, performing, by the first wireless device, data processing for the second frame, wherein the trigger frame is used for soliciting a multi-user uplink transmission, and wherein a second required time used for transmitting the second frame is not added to the updated second time parameter.

2. The method of claim 1, wherein a transmission opportunity (TXOP) for a wireless channel is acquired by the first wireless device based on a contention for the transmission of the first frame.

3. The method of claim 1, wherein the second frame is transmitted regardless of whether or not the updated second time parameter exceeds the first time parameter.

4. The method of claim 1, wherein, when an add traffic stream (ADDTS) request frame is transmitted by the first wireless device to the second wireless device for session formation, the admitted time is configured based on a traffic specification (TSPEC) element being included in an ADDTS response frame, the ADDTS response frame being received from the second wireless device as a response to the ADDTS request frame.

5. The method of claim 1, wherein the first required time is related to a sum of a first processing time used for transmitting a sequence included in the first frame, a second processing time used for receiving a first acknowledgement frame for the first frame, and a Short-Inter Frame Spacing (SIFS).

6. A first wireless device in a wireless local area network (WLAN), the first wireless device comprising:

a radio frequency (RF) unit transceiving radio signals; and a processor being operatively connected to the RF unit, wherein the processor is configured:

for a first frame belonging to an access category (AC), to compare a first time parameter related to an admitted time being set for the AC with a second time parameter related to an amount of time having been used for transmission of frames belonging to the AC, to transmit the first frame to a second wireless device based on the comparison between the first time parameter and the second time parameter, to update the second time parameter after the transmission of the first frame, wherein the updated second time parameter is related to a sum of a second time parameter and a first required time used for transmitting the first frame, and for a second frame solicited by a trigger frame received from the second wireless device, to perform data processing for the second frame, wherein the trigger frame is used for soliciting a multi-user uplink transmission, and wherein a second required time used for transmitting the second frame is not added to the updated second time parameter.

7. The first wireless device of claim 6, wherein a transmission opportunity (TXOP) for a wireless channel is acquired by the first wireless device based on a contention for the transmission of the first frame.

8. The first wireless device of claim 6, wherein the second frame is transmitted regardless of whether or not the updated second time parameter exceeds the first time parameter.

9. The first wireless device of claim 6, wherein, when an add traffic stream (ADDTS) request frame is transmitted by the first wireless device to the second wireless device for session information, the admitted time is configured based on a traffic specification (TSPEC) element being included in an ADDTS response time, the ADDTS response frame being received from the second wireless device as a response to the ADDTS request frame.

10. The first wireless device of claim 6, wherein the first required time is related to a sum of a first processing time used for transmitting a sequence included in the first frame, a second processing time used for receiving a first acknowledgement frame for the first time, and a Short-Inter Frame Spacing (SIFS).

* * * * *